United States Patent [19]

Eberly et al.

[11] 4,406,003
[45] Sep. 20, 1983

[54] OPTICAL TRANSMISSION SYSTEM

[75] Inventors: Joseph H. Eberly; Peter D. Drummond, both of Rochester, N.Y.; Marek J. Konopnicki, Albuquerque, N. Mex.

[73] Assignee: The University of Rochester, Rochester, N.Y.

[21] Appl. No.: 284,868

[22] Filed: Jul. 20, 1981

[51] Int. Cl.³ .............................................. H04B 9/00
[52] U.S. Cl. ........................................ 370/3; 455/611;
455/612
[58] Field of Search ................. 370/3, 1; 330/4.3;
455/610, 611, 612; 332/7.51; 331/94.5 R;
250/213 A

[56] References Cited

U.S. PATENT DOCUMENTS

| | | | |
|---|---|---|---|
| 4,006,363 | 2/1977 | Schlossberg | 455/610 |
| 4,209,690 | 6/1980 | Rentzepis | 455/611 |
| 4,236,243 | 11/1980 | Davies et al. | 370/3 |
| 4,368,543 | 1/1983 | Hasegawa | 455/610 |

*Primary Examiner*—Gerald L. Brigance
*Attorney, Agent, or Firm*—Martin Lukacher

[57] ABSTRACT

Short electromagnetic pulses, preferably optical pulses each of a different wavelength and/or polarization, are injected into a channel containing a medium with many energy levels in which the level populations are specified and in which the transitions between levels are in resonant relationship (resonant or nearly so) with the carrier frequencies of the pulses. When the initial pulse intensities are above a level related to characteristics of the medium, particularly when the areas of the pulses have certain relationships with each other, coincident pulses co-propagate simultaneously, substantially losslessly, and in some cases at velocities well below normal light speed in the medium, but still well above electron drift speeds in conductors, for example. The pulses may be very short in duration. Inasmuch as the co-propagation through the channel is determined by the pulse areas and the near-coincidence of the pulses, coincident relationships between successive pulses may be encoded with information to be transmitted through the channel. The system may be used for carrying out logic and switching functions, in nuclear applications as a fast coincidence counter, and in laser applications for either logic purposes or for improving the performance of multilevel lasers.

31 Claims, 13 Drawing Figures

1-2-3 = CASCADE
2-3-4 = LAMBDA
3-4-5 = V

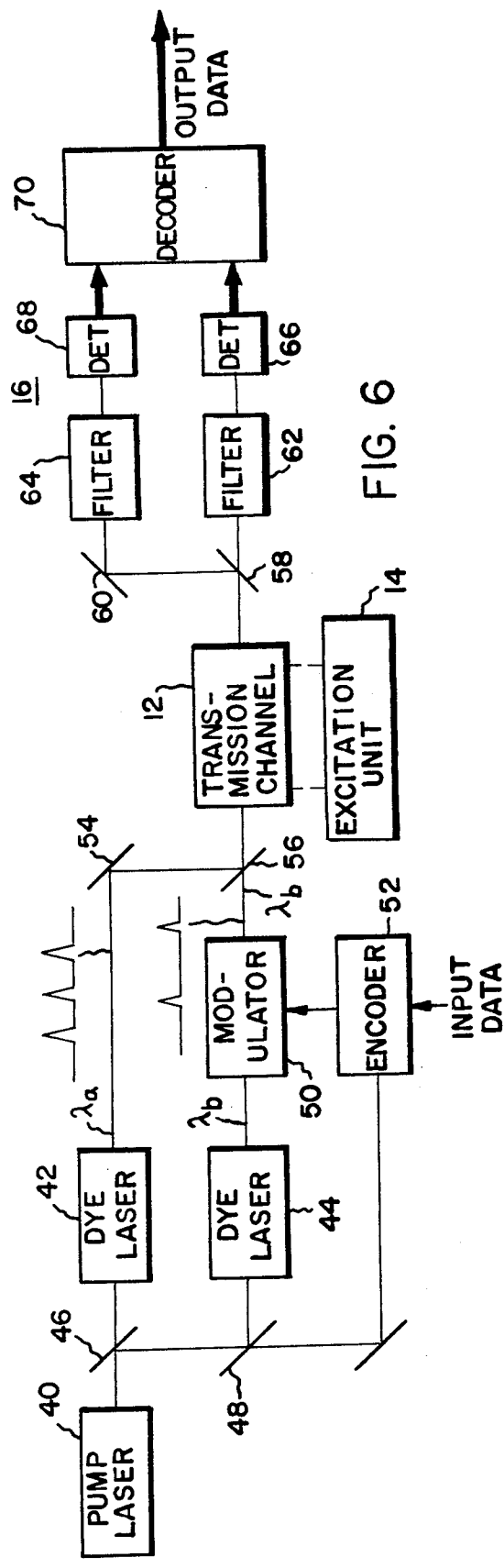
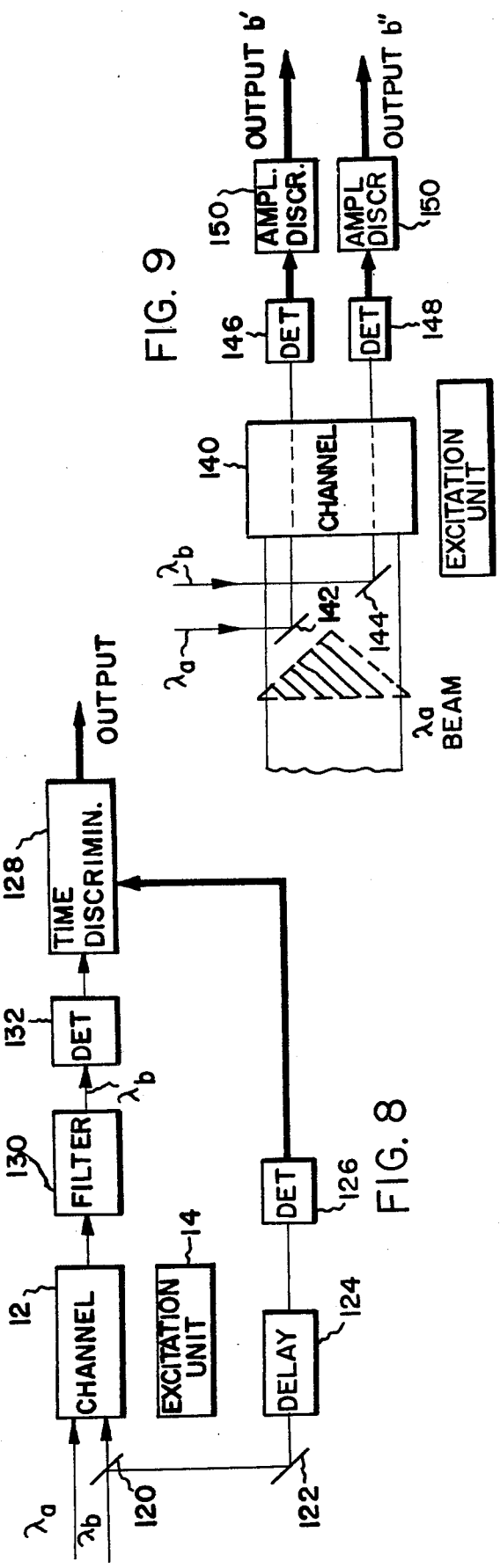

OPTICAL TRANSMISSION SYSTEM

DESCRIPTION

The present invention relates to systems for the near-simultaneous transmission of multiple electromagnetic pulses of possibly different wavelengths, particularly optical pulses, and more particularly to a pulse transmission system where the pulses themselves control their propagation.

The invention provides the means whereby the speed of the pulses may be reduced below normal light speed for the channel. Substantially lossless propagation of optical pulses of different wavelengths is obtained without the dispersion normally inherent in the course of propagation of light or other electromagnetic radiation through a practical transmission channel.

In accordance with the invention, a number of different pulse beams, each at a different wavelength (e.g., different colors for optical pulses) and/or polarization may be caused to travel at the same speed, rather than at different speeds for each wavelength. In accordance with the invention, also, the transmission properties are different when some pulses (e.g., some of the colors) are absent and when some of the pulses are present. Accordingly the pulses themselves control the transmission characteristics of the channel and one pulse controls another, or a group of others. In other words light may be used to control light. Logical functions and switching as well as the detection of very short (e.g., $10^{-12}$ second duration) pulses may be carried out in accordance with their mode of transmission through the channel.

Lossless transmission of optical signals implies transparency of the medium through which the signals propagate. Consideration has heretofore been given to self-induced optical transparency due to interaction of the energies of the light and the atomic structure of a medium on which light is incident. Such interactions occur at a single wavelength in certain media. The concepts of self-induced transparency theory are insufficient for the transmission of a plurality of different pulses of different wavelength and/or polarization and the use of the pulses themselves to control propagation and therefore transmission thereof.

Accordingly it is an object of the present invention to provide an improved electromagnetic pulse transmission system suitable for the controlled transmission of a plurality of pulses of electromagnetic energy, including optical pulses which are of visible and near visible wavelengths (e.g. infrared and ultraviolet).

It is a further object of the present invention to provide an improved electromagnetic pulse transmission system which enables the selective transmission of pulses in accordance with their intensities, coincident or other spatio-temporal relationship, polarization, wavelength and the characteristics of the channel through which they are transmitted.

It is a still further object of the present invention to provide an improved optical transmission system for the co-propagation of optical pulses of different wavelengths at speeds much less than the speed of light.

It is a still further object of the present invention to provide an improved optical transmission system capable of performing logical and switching functions upon optical pulses.

It is a still further object of the present invention to provide an improved optical pulse transmission system which enables substantially lossless transmission of extremely short pulses, such as optical pulses in the picosecond and subpicosecond regime.

It is a still further object of the present invention to provide an improved laser or pulse amplification system for simultaneous pulses of different wavelength and/or polarization.

Briefly described, a system for transmitting electromagnetic pulses, such as optical pulses of different wavelengths and/or polarizations, at the same velocity through a transmission channel, in accordance with the invention, makes use of a medium having a multiplicity of energy levels. The pulses are applied to the input end of the channel which contains the medium. The wavelengths of the pulses are matched to the transitions between successive pairs of the energy levels so that different pulses are in resonant or near-resonant, and energy interactional, relationship with different ones of the transitions. The intensities of the pulses are such that the areas thereof satisfy certain critical relationships. "Area" is here, and below, used in a quantum mechanical sense. This area is generally proportional to the product of the electric field strength of a pulse, the atomic dipole moment of the transition with which the pulse is in near-resonant relationship, and the ratio of the duration of the pulse to Planck's constant.

The pulses having these relationships propagate at low loss and at equal velocities, much less than the velocity of light in the medium (in the case of an attenuator), in spite of the property of dispersion which usually requires each wavelength to travel at a speed different from the speed of other wavelengths as it propagates through a medium. Low loss propagation and/or distortionless propagation relative to a specified input, requires the (at least partial) temporal overlap of the pulses with each other.

The foregoing and other features, objects, and advantages of the invention, as well as the presently preferred embodiments and best modes presently known for the practice of the invention, will become more apparent from the reading of the following description in connection with the accompanying drawings in which.

Figure 3A:
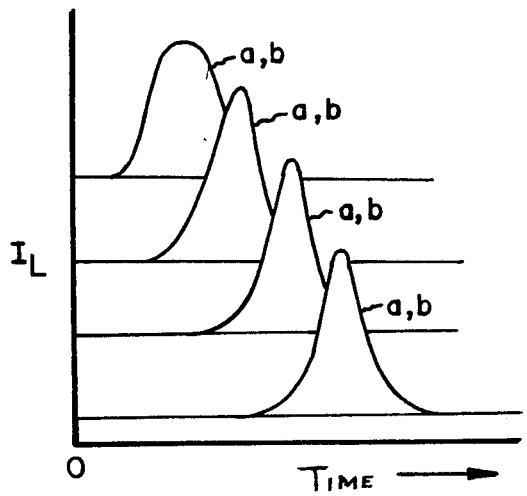
Figure 3B:
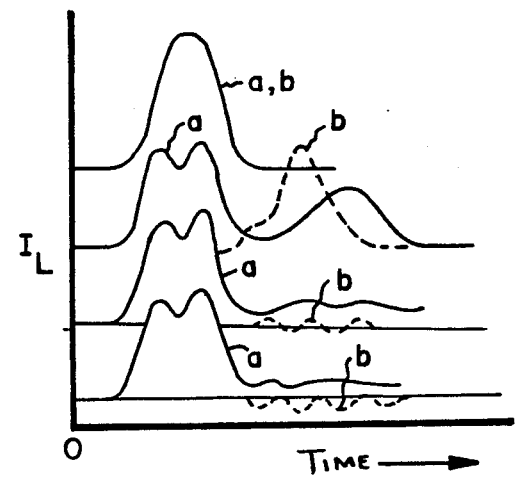
Figure 4:
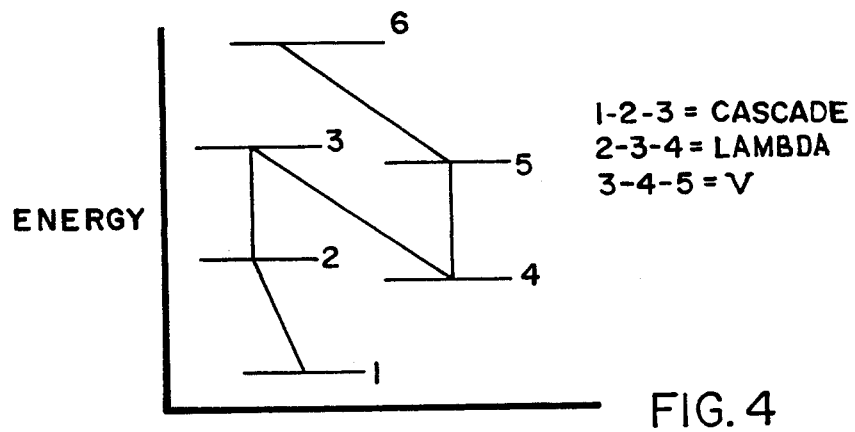
Figure 5:
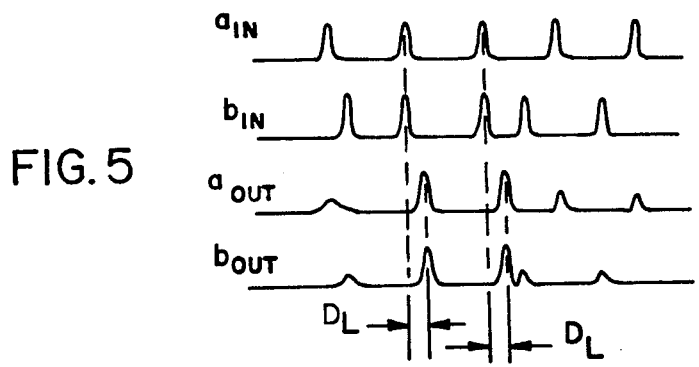
Figure 7:
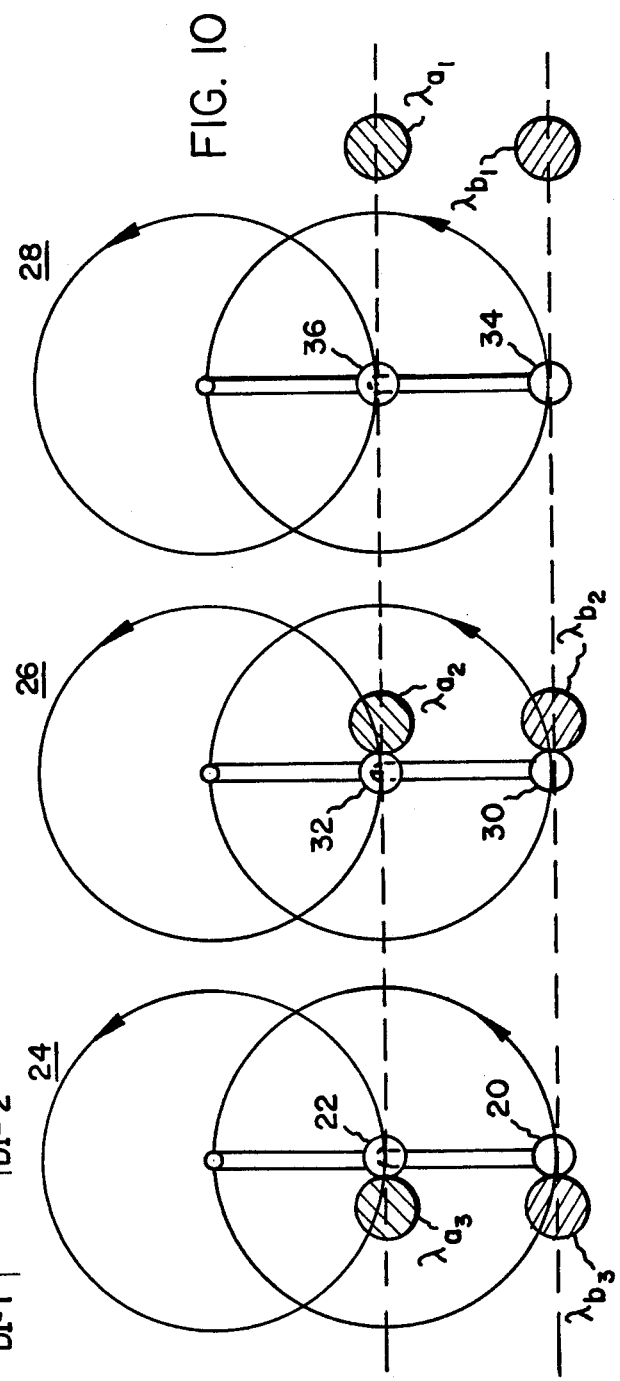
Figure 10:
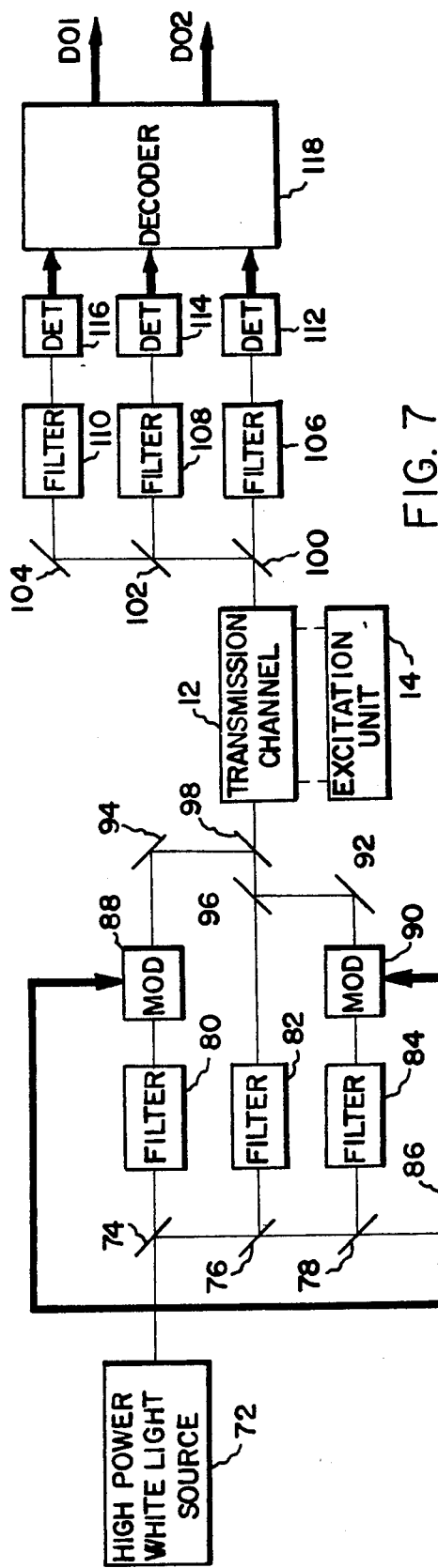
Figure 11:
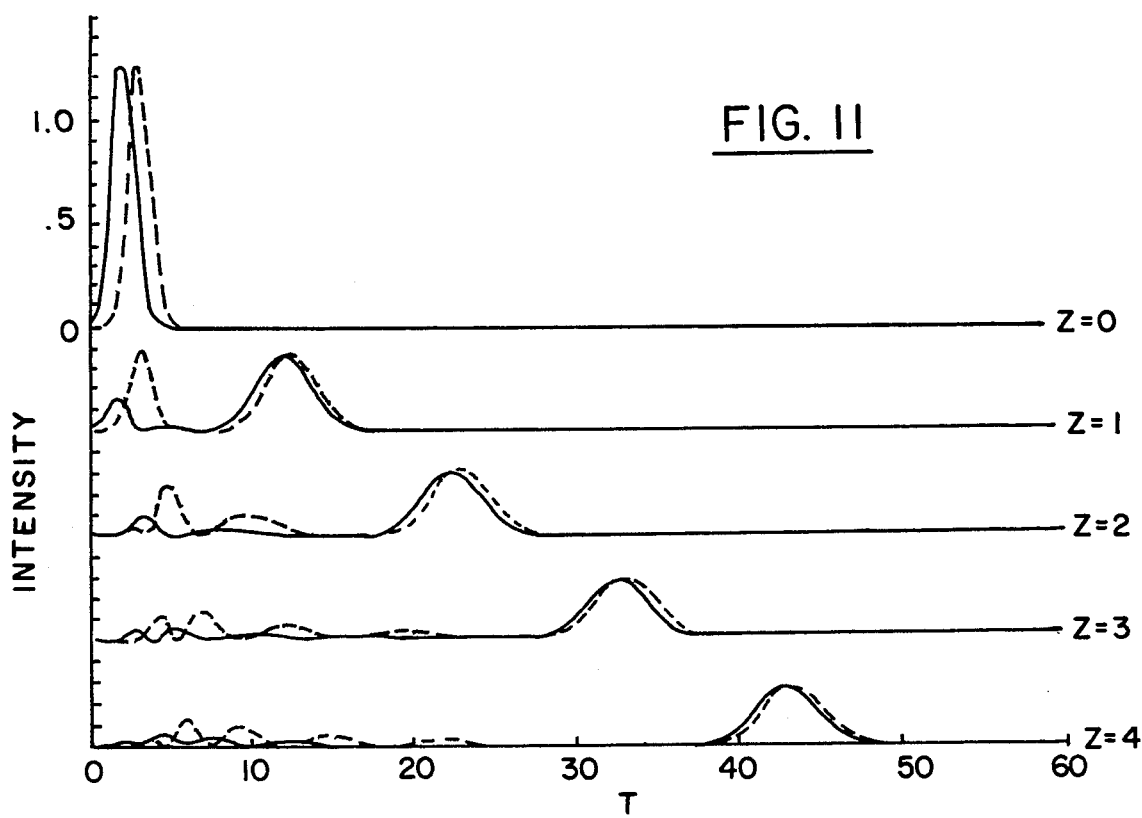
Figure 12:
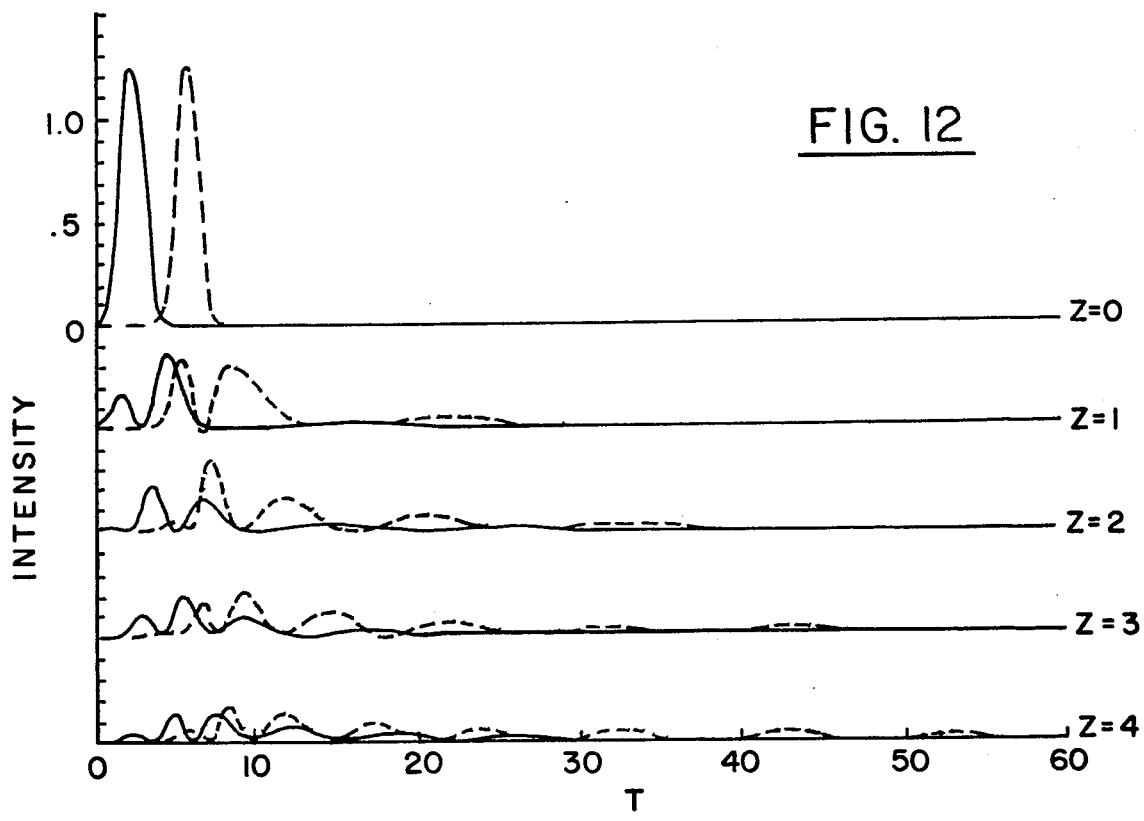

FIGS. 3A and 3B illustrate the propagation of initially coincident, different-wavelength pulses which (A) are matched to the medium of the transmission system, and which (B) are not matched to the medium, respectively; the diagrams illustrate the intensity profiles of the pulse pairs at the input face of the transmission channel and after successively deeper or longer propagation distances into the channel;

FIG. 4 is an energy level diagram illustrating a medium having six energy levels and showing the convention of numbering along a chain of dipole-allowed transitions to illustrate cascade sequences (1-2-3 and 4-5-6), a "Lambda" sequence (2-3-4) and a "V" or "Vee" sequence (3-4-5);

FIG. 5 is a diagram illustrating the wave forms and timing of exemplary pairs of input pulses, with the output pulses obtained at the output end of a channel of an optical transmission system in accordance with the invention;

FIG. 6 is a schematic diagram illustrating an optical transmission system in accordance with an embodiment of the invention which may be used for the transmission of data;

FIG. 7 is a schematic diagram of an optical transmission system in accordance with another embodiment of the invention which may also be used for data transmission;

FIG. 8 is a schematic diagram illustrating a coincidence detector or counter in accordance with an embodiment of the invention;

FIG. 9 is a schematic diagram illustrating another embodiment of an optical transmission system in accordance with the invention;

FIG. 10 is a simplified mechanical model which may lead to a qualitative understanding of the quantum theory of operation of an optical transmission system embodying the invention;

FIG. 11 is a graph illustrating coincident pulse propagation in a "V" medium; and FIG. 12 is a graph illustrating noncoincident pulse absorption in a "V" medium.

Figure 1:
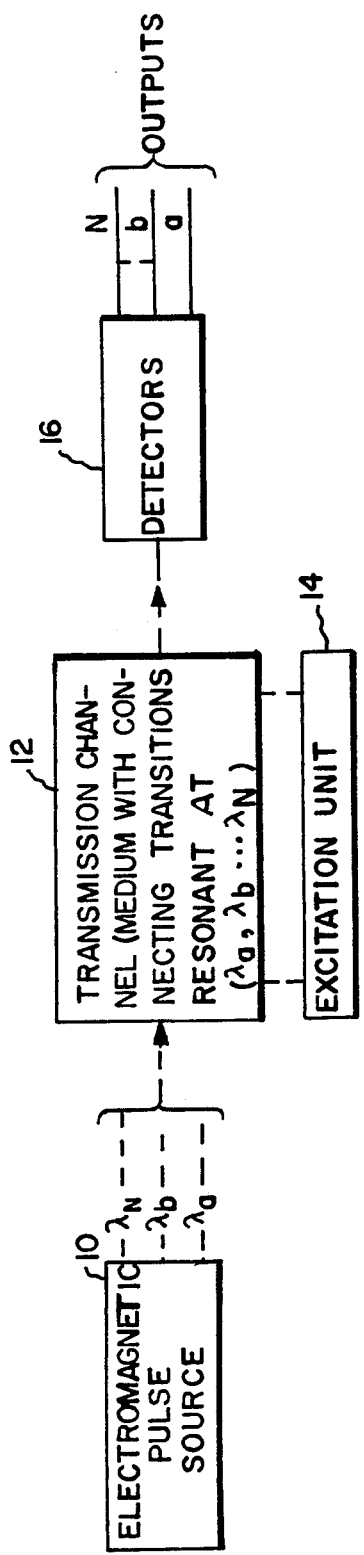
FIG. 1 is a schematic diagram illustrating an electromagnetic pulse transmission system in accordance with the invention.

Referring first to FIG. 1, an electromagnetic pulse source 10 generates two or more short optical pulses of different wavelengths $\lambda_a$, $\lambda_b$ and $\lambda_N$ which have a spatially overlapping relationship, preferably occurring simultaneously. This set of pulses is called a simulton. The $\lambda_a$ and $\lambda_b$, different wavelength pulses of a two-pulse simulton is shown at the left in FIG. 2. These sets of pulses or simultons may be generated successively by the source 10 and are applied as spatially coincident beams to a transmission channel 12. To sustain simultaneous (equal velocity) and lossless propagation of the short optical pulses which are injected at the input end of the channel 12, the channel contains a medium which has a plurality of energy levels and two or several connected dipole transitions among these levels. Atomic or molecular vapors in a container defining the channel may be used as the medium; for example, hydrogen, sodium or barium vapor. The medium may also be a solid, liquid or plasma. When the source 10 is a laser it is even possible that the medium be made from the same material as the active laser medium. For example if the laser is an Nd-glass laser the medium in the channel 12 can also be made from the Nd-glass. Further applications occur when the medium itself has gain characteristics (or inversions) at several transition wavelengths and/or polarizations.

The medium can be excited, so that its energy levels are populated to some degree, by an excitation unit 14 such as a heater or a flash lamp or another laser.

To sustain simultaneous, lossless propagation of optical pulses it is desirable that the width of the homogeneous optical absorption lines of the medium, denoted $\Delta\nu_a$, $\Delta\nu_b$, etc., are narrower than the bandwidths are the carrier frequencies of the optical pulses. For example $\Delta\nu_a$ should be much less than $\nu_a$, which is the carrier frequency of the optical input pulse of wavelength $\nu_a$. Similarly the absorbing line b of line width $\Delta\nu_b$ (transition 2-3) should be much narrower than the carrier frequency of the $\lambda_b$ optical input pulse.

The inhomogeneous line widths can be broader than the relevelent band widths if the excited transitions have nearly equal inhomogeneous line widths and dipole strengths.

Another important characteristic of the medium in the channel 12, or of the pulses which are transmitted through the channel, is that each pulse of the simulton is resonant (or nearly resonant) with a different one of the medium's transitions. The $\lambda_a$ pulse is, for example, resonant with transition 1-2 and the $\lambda_b$ pulse is resonant with transition 2-3. This means that the energy per photon of the pulse is equal (or nearly equal) to the atomic transition energy. The transition energy $E_a$ of transition 1-2 is therefore equal to $n\omega_a$ where $\omega_a$ is the frequency of the pulses of wavelength $\lambda_a$; and the transition energy $E_b$ of transition 2-3 is equal to $n\omega_b$, the angular frequency corresponding to the pulses of wavelength $\lambda_b$. Planck's constant is n.

The simultaneity of the pulses may be indicated by the overlapping relationship in their times of occurrence; $T_a$ being approximately equal to $T_b$, the occurrence times of each pulse. The intensity of the pulse is such as to provide sufficient interaction between the transition's dipole moments and the fields due to the pulses in the medium of the channel 12. This intensity may be considered quantum mechanically in terms of the areas of the pulses, which are determined by the electric fields of the pulses and the dipole strengths of the transitions with which they are resonant. In a cascade arrangement of energy levels in an attenuator such as shwon in FIG. 2, the areas of at least one of the input pulses, $A_a$ and $A_b$ should be greater than $2\pi/\sqrt{2}$. In a cascade arrangement with inversion of population, pulse areas tend to increase to a stable value that depends on the dipole moments. These relationships are applicable in the simplified example shown in FIG. 2.

The resulting different wavelength optical pulses, the simultons, can have widely different wavelengths. This has been verified using numerical methods described in M. J. Konopnicki and J. H. Eberly, *Proc. of 10th Ann. Simulation and Modeling Conf.*, W. G. Vogt and M. H. Mickle, Eds. (Instrument Soc. of America, Pittsburgh, 1979), p. 1199. A simulton is distinct, theoretically and practically, from pulse trains observed after large-area pulse breakup in two-level absorbers, and quite different from two-photon self-induced transparency pulses (see R. E. Slusher and H. M. Gibbs, Phys. Rev. A 5, 1964, and 6, 1255 (1972); N. Tan-no and Y. Higuchi, Phys. Rev. A 16, 2181 (1977); and S. L. McCall and E. L. Hahn, Phys. Rev. 183, 457 (1969)). Transmission of simultons in the system provided by the present invention as shown in FIG. 1 and elswhere hereinafter is, therefore, different and distinct from large-area pulse breakup and self-induced transparency effects. The innovative feature here is the coherent interaction of more than one input pulse with a multilevel medium, with a resulting transmission characteristic depending on the relative pulse timings and areas.

Figure 2:
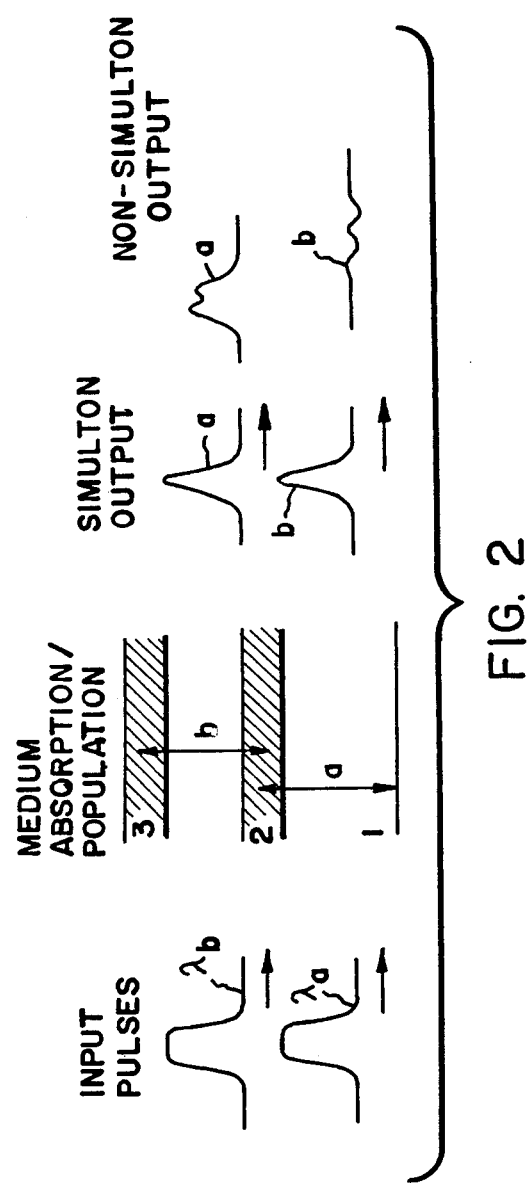
FIG. 2 is a schematic representation of propagation of two pulses simultaneously, as a two pulse "simulton", and non-simultaneously, as a "non-simulton," in a medium which has three energy levels (a three-level absorber), such as may be used in the system illustrated in FIG. 1.

The simultons are transmitted through the channel and leave the output end thereof. Detectors 16 at the output end of the channel provide output signals corresponding to each pulse of the simulton, namely outputs a, b . . . N. The detectors may operate to detect simultons by the amplitude of the outputs which can be much higher than in the case of nonsimulton outputs because of lossless propagation in the channel. These amplitudes are indicated in FIG. 2. The pulses may be detected in accordance with the time for transmission through the channel and/or their simultaneous transmission therethrough and simultaneous receipt at the output end of the channel. The detectors may be interactive or interconnected to provide outputs in response to the simultaneous occurrence of the outputs and the significantly different transit times through the channel than is the case for nonsimulton outputs. The difference in velocities of transmission of the nonsimulton outputs, which are shown in FIG. 2, result from dispersion of the different wavelengths in the channel. Nonsimultons also are subject to absorption by the absorbing transitions of the medium which result in attenuation which is not as severe for simulton outputs.

FIG. 3A demonstrates a specific example of a two-pulse simulton as it is transmitted through different lengths of the channel 12 having a medium which is matched to the pulses. The pulses a,b propagate without substantial loss or distortion through the channel. Where the channel is not matched to the pulses, as shown in FIG. 3B, there is attenuation and dispersion between the different wavelengths pulses, a and b, as they propagate deeper and deeper from the input end of the channel. The pulse characteristics of simulton and nonsimulton pulses are clearly so different as to make their detection easy to accomplish.

FIG. 5 illustrates the effect of simultaneous injection of the different wavelength pulses. These pulses $a_{in}$ and $b_{in}$ are injected at the input end of the channel 12 in pulse trains. Only the second and third pulses of the trains are coincident. The coincident pulses constitute simultons, whereas the noncoincident pulses are nonsimultons. The simultons propagate with much greater delay time, $D_L$, to the output end of the channel where they occur coincidentally but delayed. The nonsimulton pulses at the output end, $a_{out}$ and $b_{out}$, are significantly attenuated and propagate with the speed of light to the output end of the channel. In other words the $a_{in}$ and $a_{out}$ pulses are substantially coincident, as are the $b_{in}$ and $b_{out}$ pulses in the case of the nonsimulton inputs and outputs. It will be observed that input signals may be coded in order to inject them as simultons or nonsimultons at the input of the channel whereby to transmit data or other information by means of the transmission system provided by the invention.

FIGS. 11 and 12 show the results of a numerical (computer) calculation of the effect of relative timing on simulton propagation for different propagation distances. FIG. 11 gives results for small relative delay (large pulse overlap), while FIG. 12 gives results for large relative delay (small pulse overlap). The input pulses are shown at the top of each graph. It is clear that in the large overlap situation a relatively stable combination of the two inputs emerges. This combination is propagated at a velocity less than the normal light velocity, and without attenuation. This is characteristic of a simulton. In the small overlap case, no stable combination pulse emerges. Instead, each input is attenuated and travels near to the normal velocity. These output results are at the bottom of each graph. The delays in FIGS. 11 and 12 are 1.0 and 3.5 units, where the standard deviation in time of each Gaussian envelope of the input electric field is one unit. The input areas are chosen to be $0.9\pi$ in all cases. The solid line represents the first input, the dashed line the second input, in each figure. The successive distances are at $Z=0, 1, 2, 3, 4$ where $Z=(g\tau z)$ is the effective (dimensionless) propagation distance.

The medium is chosen to have a lossless character, with the vee (V) arrangement of energy levels, and negligible Doppler width (as appropriate for wideband input pulses). One possible example of this type of medium would be a $(J=0) \rightarrow (J=1)$ transition where the twin upper states represent $m=(\pm 1)$ magnetic sublevels. The different input modes could be distinguished either by Zeeman splitting of the magnetic sublevels or by using plane polarized radiation in mutually orthogonal directions for the input, with polarized detection of the output.

The mechanical model shown in FIG. 10 may be helpful in obtaining a qualitative understanding of the operation of the transmission system provided by the invention. The model shows a chain of pendulums representing three atoms. "Electrons" 20, 22, of the first of three pairs of "atoms" 24, 26 and 28, are arranged in the chain adjacent the "electrons" 30 and 32 of the "atoms" 26 and the "electrons" 34 and 36 of the "atom" 28. The "electron" pendulum of each "atom" is doubly articulated. The pendulums represent pointers which point to the state where the energy of the atom is located. Down indicates the ground state. The higher energy state is the state indicated by the pendulum pointing up. Each of the pendulums is shown in the down position for the simplicity of illustration in the model of FIG. 10. The lower "electrons" 20, 30 and 34 have their pendulum arms pivotally connected to the ends of the upper pendulum arms. This connection is shown at the center of the upper electrons 22, 32 and 36. The light pulse energy photons are shown as cross-hatched balls labeled $\lambda_a$ and $\lambda_b$. $\lambda_{a1}$, $\lambda_{a2}$ and $\lambda_{a3}$ represent three different positions of a $\lambda_a$ photon which interacts with the electrons 22, 32 and 36. $\lambda_{b1}$, $\lambda_{b2}$ and $\lambda_{b3}$, represents three different positions of a $\lambda_b$ photon which interacts with the other "electrons" 20, 30 and 34 of each pair of "atoms" 24, 26 and 28. If the photons result from optical pulses $\lambda_a$ and $\lambda_b$ of a simulton, in resonant relationship with the transitions of the medium, and if the pulses have sufficient energy as represented by their area, they will propagate along the chain and transfer all of that energy to the "electrons" and have all of that energy returned by elastic collisons. The elastic collisons occur simultaneously at the "electrons" of each pair of "atoms" 24, 26 and 28. This drives the "electrons" to their upper energy state and past that state so that they swing around in their doubly articulated cycle and impart substantially all of the energy, which the "electrons" initially derived from the photons, back to the photons. The photons are driven on to the "electrons" of the next pair of "atoms" where the process repeats. The photons are shown in the position $\lambda_{a3}$ and $\lambda_{b3}$ where they strike the "electrons" 22 and 20 and drive them around through their energy cycle.

The photons are shown in position $\lambda_{a2}$ and $\lambda_{b2}$ receiving momentum from the "electrons" 30 and 32. Finally after being transferred through the last pair of "atoms" 28, the energy is returned with the photons leaving the channel at $\lambda_{a1}$ and $\lambda_{b1}$. Very little energy is lost due to the lossless exchanges of energy in each atom pair (i.e., lossless propagation of the simulton pulses). The model also shows the simultaneous transmission of each simulton through the atomic chain. The photons stay in step, in the same coincident relationship at the output as the input of the chain.

The model also shows the reduction in velocity of propagation of simulton pulses. The doubly articulated pendulums store the photon energy while they orbit. Since substantially all of the momentum is transferred upon collision, the photons stop and remain at each atom pair until the electrons swing up and over, to fall back for another elastic collision with the photons. This process can therefore be thought of as involving the storage of energy in the atoms between collisions with the photons. Because of the storage, the photons propagate at slow averaged speeds, say 10 to 100 times slower than they would normally propagate in the transmission channel. The need for sufficient momentum to be transferred to cause the electrons to travel all the way around their orbit illustrates that a certain threshold energy of the photons is required in order for the lossless, slow propagation illustrated in FIG. 10 to take place.

It should be understood that this model is entirely tutorial and is used so as to qualitatively illustrate simultaneity, reduced velocity and threshold effects which are exhibited in the operation of the system. In the case of a gain medium, the model should be interpreted as having pendula initially in the up position, which supply energy to the photons, with a reduced delay time. A more detailed theoretical presentation of system operational characteristics is presented hereinafter. Also presented hereinafter, as an appendix to this application, is a more detailed theoretical presentation of the operation of transmission systems provided in accordance with the invention.

Referring next to FIG. 6, there is shown an optical transmission system having a transmission channel 12 which is operated upon by an excitation unit 14, as was explained in connection with FIG. 1. The system includes means for the coherent generation of optical pulses of different wavelengths $\lambda_a$ and $\lambda_b$ in succession and in accordance with input data so as to transmit such data through the channel 12. The injection means is provided by a pump laser 40 which provides a train of pulses to tunable dye lasers 42 and 44 via beam splitters 46 and 48. These dye lasers are tuned to different frequencies and have energy levels that match the transmission channel 12, as explained above. A modulator 50, such as an electro-optical switch, is operated upon by an encoder 52 synchronized by optical pulses obtained through the beam splitters 46 and 48 from the pump laser 40. These pulses enable the modulators to switch on or off in coincident with the pump pulses according to the data which is to be transmitted. In the output, from the dye lasers 42 and 44, three pulses are shown of the $\lambda_a$ wavelength. The $\lambda_b$ wavelength contains two pulses which are coincident with the first and second pulse at $\lambda_a$. The middle pulse is missing due to the action of the modulator 50 in response to the input data to the encoder 52. Accordingly, two simultons and one nonsimulton, for the three pulses indicated, are transmitted in a combined beam by means of a mirror 54 and a dichroic combiner 56, and injected into the channel 12 at the input end thereof.

In the detector 16, at the output end of the channel 12, the beams of different wavelengths are separated by a dichroic splitter 58 and a mirror 60. The different wavelength pulses are separated by filters 62 and 64 turned to the wavelengths $\lambda_a$ and $\lambda_b$. Photo-detectors 66 and 68 obtain electrical signals from the filters. The timing and amplitudes of the pulses obtained from the photo-detectors 66 and 68 are applied to a decoder 70 containing logic which transmits the data, say binary "1"s and binary "0"s for simultons and nonsimultons, respectively.

For example, in a system such as shown in FIG. 6 the two wavelengths $\lambda_a$ and $\lambda_b$ may be approximately 5,900 Angstroms and 5,700 Angstroms. The medium in the channel 12 may be sodium vapor having spectral lines at 5,900 and 5,700 Angstroms corresponding to their 3S-3P and 3P-5D transitions. A helical xenon flash lamp may provide the excitation unit which populates the 3S, 3P and 5D levels. The wavelength of the pulses are matched as shown by the following relationships.

$$\sigma = |\lambda_a d_b^2| / |\lambda_b d_a^2|.$$

$\lambda_a$, $\lambda_b$, $d_a$ and $d_b$ are the wavelengths and dipole matrix elements of each transition. The near resonant relationship occurs assuming $\sigma$ to be approximately equal to 0.05. The pulse area relationship represented by the following equations:

$$\Omega_1 = \frac{2\alpha_1}{\tau} \text{sech}\left(\frac{t-t_0}{\tau}\right)$$

$$\Omega_2 = \frac{2\alpha_2}{\tau} \text{sech}\left(\frac{t-t_0}{\tau}\right)$$

The requisite pulse areas are obtained when $\alpha_1$ equals 1.95 and $\alpha_2$ equals 0.44. Then an individual 5,700 Angstrom pulse contains a pulse area of $0.88\pi$ which copropagates with the 5,900 Angstrom pulse, having a pulse area of $3.9\pi$. By detecting the relatively high intensity output at 5,700 Angstroms in a detector system 16 such as shown in FIG. 6, the propagation of simultons may be indicated. The detection of low amplitude pulses indicates a nonsimulton condition.

Referring next to FIG. 7, the optical transmission system shown therein includes a transmission channel 12 with an excitation unit 14, both having the characteristics described above. The means for injecting optical pulses into the end of the channel involves the use of a high power white light source 72 such as an arc lamp. Beam splitters 74, 76 and 78 route the light from the source 72 to three filters 80, 82 and 84 which provide narrow bandwidth, monochromatic light beams of three different wavelengths. These beams may be generated in the form of pulses by turning the source 72 on and off at regular intervals, for example by a mechanical chopper, rotating mirror, electro-optic switch, or other device. These pulses are detected by an encoder 86. For synchronizing purposes, in the encoder 86, as was the case in the encoder 52, electrical pulses derived from the light pulses by a photo detector may be used to synchronize outputs thereof to modulators 88 and 90. This output may be electrical pulses which are turned on and off in accordance with input data pulses DI-1 and DI-2 synchronously with the light pulses.

The modulators 88 and 90 may be electro-optical switches which are turned on and off by the electrical pulses from the encoders 86, selectively in accordance with the input data. There will be a continuous train of pulses from the filter 82, but different pulses may be absent depending upon the input data, from the pulses provided by the other filters 80 and 84, due to the modulators 88 and 90. Mirrors 92 and 94 and dichroic combiners 96 and 98 inject the optical pulse beams of the three different wavelengths in spatially coincident relationships (in the same area) of the input end of the channel 12. The detection system at the output end of the channel separates the different wavelengths pulses by means of beam splitters 100 and 102, and a mirror 104 together with filters 106, 108 and 110 which are tuned to the three different wavelengths. These wavelengths are passed on to photo detectors 112, 114, and 116. The electrical signals from the detectors are decoded in a decoder 118 having suitable logic for providing output data signals D01 and D02.

Referring next to FIG. 8, there is shown an optical transmission system also using a channel 12 with an excitation unit 14. Different wavelength pulses $\lambda_a$ and $\lambda_b$ are injected into the input end of the channel. A beam splitter 120 and mirror 122 shunts part of one of the pulses, $\lambda_b$, to an optical delay line 124. A photodetector 126 translates the delayed $\lambda_b$ pulses into electrical signals and applies these signals to a time discriminator 128. $\lambda_b$ pulses are obtained by means of a filter 130 at the output end of the channel 12 and translated into electrical pulses by a photodetector 132. These pulses from the detector 132 are also applied to the discriminator 128. When the $\lambda_a$ and $\lambda_b$ pulses are nonsimultons, the electrical pulse inputs to the time discriminator 128 are coincident, due to the delay 124 making up for any delays in the channel and components associated therewith. A nonsimulton output is therefore indicated by coincidence. When $\lambda_a$ and $\lambda_b$ pulses are simultons, the input pulse from the detector 126 arrives at the time discriminator 128 much sooner than the pulse from the detector 132. This time delay is detected as an output indicative of coincidence of the input optical pulses. The pulses may be counted and the system is useful as a coincidence counter to optical pulses. Such pulses may be very short in duration.

Referring to FIG. 9, an optical transmission system is shown having a channel 140 with an aperture as wide as or wider than the aperture of a beam of optical pulses at one of the wavelengths, $\lambda_a$. $\lambda_b$ pulses in much smaller aperture beams are injected into the channel through the use of dichroic mirrors 142 and 144. Photooptical detectors 146 and 148, in alignment with the $\lambda_b$ beams, detect optical pulses of amplitude greater than a certain threshold when the $\lambda_a$ and $\lambda_b$ optical pulses are simultons. Amplitude discriminators 150 and 152 detect these simulton $\lambda_b$ pulses and provide output $b^I$ and $b^{II}$.

Consider now the following brief theoretical analysis of the operation of transmission systems described above.

We suppose a plane-wave incident electric field $E(z,t)$ with N distinct frequency components:

$$E(z, t) = \sum_{l=1}^{N} \left[ \epsilon_l \epsilon(z, t)_l e^{i\nu_l C_l(t - \frac{z}{c})} + c \cdot c \right] \quad (1)$$

where $\nu_l$ denotes the (circular) carrier frequency of the l-th component, $\epsilon_l$ is its possibly complex polarization vector, and $\epsilon(z,t)_l$ is its complex amplitude, assumed to be a slowly varying function of z and t in the usual sense, as described in L. Allen and J. H. Eberly, *Optical Resonance and Two-level Atoms*, (Wiley, New York 1975). The frequencies $\nu_l$ in a chain of N+1 dipole-connected energy levels in an atomic or molecular system, and $C_l$, depend on the energy level ordering. In a six-level system, showing the numbering successively along the chain of dipole-allowed transitions, there are three different possible configurations ("cascade," "lambda," and "V") of groups of 3 consecutive energy levels in the chain. FIG. 4 is an example of a six level system. For increasing energies ($E_{n+1} > E_n$) we define $C_n = 1$, otherwise $C_n = -1$. This allows the Bloch equations in the rotating wave approximation to have an invariant form for any energy level ordering. The time evolution of $(N+1)^2$ diagonal and off-diagonal atomic projection operators of the atoms is calculated from the dipole interaction $-d \cdot E(z,t)$.

The atomic projection operators $\sigma_{jk}$ and their rotating frame expectation values $r_{jk}$ are defined as:

$$\hat{\sigma}_{jk} = |j\rangle\langle k| \quad (2)$$

$$r_{jk} = \langle \hat{\sigma}_{jk} \rangle \exp\left( -i \left[ \sum_{l=k}^{j-1} \nu_l C_l \left( t - \frac{z}{c} \right) \right] \right) \quad (j > k).$$

A representative one of the $(N+1)^2$ atomic evolution equations can be written (for $j > k$) in the rotating wave approximation:

$$\frac{\partial}{\partial t}(r_{jk}) = i\Delta_{jk} r_{jk} + \quad (3)$$

$$\frac{i}{2} [r_{j,k-1} \Omega^*_{k-1} + r_{j,k+1} \Omega_k - r_{j+1,k} \Omega^*_j - r_{j-1,k} \Omega_{j-1}]$$

Here $\Delta_{jk}$ is the cumulative detuning of the j-k transition and $\frac{1}{2}\xi_j(z,t)$ is the appropriate Rabi frequency (normalized electric field amplitude)

$$\Delta_{jk} = \omega_{jk} - \sum_{l=k}^{j-1} C_l \nu_l \quad (4a)$$

$$\Omega_{1j} = \frac{2d_j}{\hbar} \epsilon(z, t), \quad (4b)$$

$$\omega_{jk} = \left[ \frac{E_j - E_k}{\hbar} \right] \left( 1 + \frac{v}{c} \right) \text{ is the usual Doppler-}$$

Shifted transition frequency between atomic levels j and k (of energies $E_j$, $E_k$) and $d_j = \langle j|d|j+1\rangle \cdot \epsilon_j$ is the appropriate component of the dipole matrix element.

Equation (3), which is an (N+1)-level Bloch equation, combined with the N reduced Maxwell equations:

$$\left[ \frac{\partial}{\partial z} + \frac{\partial}{\partial (ct)} \right] \Omega_j(z, t) = -iC_j G_j \langle r_{j+1,j} \rangle \quad (5)$$

comprise a semiclassical description of N electromagnetic pulses propagating in an atomic or molecular medium, with pulse lengths short relative to atomic or molecular relaxation times. In equation (5) $G_j$ is the primitive gain coefficient (gain times linewidth per unit length) of Icsevgi and Lamb, *Phys. Rev.* 185, 517 (1969).

$$G_j = \frac{4\pi N |d_j|^2 \nu_j}{\hbar c}, \quad (6)$$

where $\nu$ is the atomic density, and $\langle \ldots \rangle$ denotes averaging over the Maxwellian velocity distribution of atoms.

The existence of the simulton solutions of the coupled Maxwell-Bloch equations (3) and (5) can be shown most easily in the case of resonant input pulses having Fourier transforms much broader than the inhomogeneous linewidths, so that Doppler broadening is negligible (sharp-line case). We postulate the following solutions:

$$\Omega_n(\zeta) = a_n \dot{\theta}(\zeta) = \frac{2a_n}{\tau} \text{sech} \frac{(\zeta)}{\tau}, \quad (7a)$$

$$r_{n,n+j}(\zeta) = C_{n,n+j} \begin{pmatrix} 1 - \cos\theta(\zeta) \\ i \sin\theta(\zeta) \end{pmatrix} + p_n \delta_{j,o}, \begin{pmatrix} j \text{ even} \\ j \text{ odd} \end{pmatrix}, \quad (7b)$$

where $$\zeta = t - \frac{z}{v};$$

$v$ is the velocity of the simulton; $\tau$ is the simulton length; and dot (.) denotes derivative with respect to $\zeta$; and $p_n$ is the initial population of the n-th level. The probability conservation law $$\Sigma_n r_{nn} = 1$$

implies that $$\Sigma_n p_n = 1 \text{ and } \Sigma_n C_{nn} = 0.$$

Substitution of solutions (7) into the Bloch equations (3) will lead to a system of algebraic equations for coefficients $C_{nm}$ and $p_n$. Solving, one obtains expressions for $C_{nm}$'s in terms of initial conditions $p_n$ and field amplitudes $a_n$ (assumed to be known). One also obtains certain constraints imposed on the initial populations and possible field amplitudes. Further substitutions of those solutions into the Maxwell equations (5) will result in an expression relating $\tau$ and $v$, and additional conditions that the field amplitudes $a_n$ and/or medium physical parameters have to satisfy. One can illustrate the above remarks with specific examples.

(a) Cascade configuration. Equal primitive gain coefficients ($G_j = G$, $j = 1, \ldots, N$).

The Rabi frequencies coefficients are given by $$a_n = \sqrt{n(N + 1 - n)} \quad (8a)$$

an expression identical to that in the Cook-Shore solutions of coherent (N+1)-level dynamics without propagation. Unlike the Cook-Shore solutions, R. J. Cook and B. W. Shore, Phys. Rev. A 20, 539 (1979), however, we find conditions on the initial populations. One possibility is:

$$P_n = 2(N + 1 - n)/[N(N + 1)] \quad (8b)$$

which assumes zero population in level N+1 at t=0. The remaining coefficients are given by $$C_{nn} = [2n - (N + 2)]/[N(N + 1)], \quad (8c)$$

$$C_{n,n+j} = \begin{cases} 0 & j > 1 \\ [n(N + 1 - n)]^{\frac{1}{2}} & /[N(N + 1)], j = 1 \end{cases} \quad (8d)$$

(b) 3-level atom. Cascade configuration. Unequal primitive gain coefficients. The Rabi frequency coefficients are now given by $$\alpha_1^2 = \frac{4}{1 + \beta}, \alpha_2^2 = \frac{4\beta}{1 + \beta}, \quad (9)$$

where $$\beta = \frac{d_2^2 \nu_2}{d_1^2 \nu_1}$$

is the ratio of the oscillator strengths of the two transitions. Coefficients $C_{ij}$ and $p_j$ can be conveniently expressed in terms of the initial inversion between first and second levels 1 and 2, of the three-level atom labeled $a_1$($a_1 = p_2 - p_1$):

$$p_1 = \tfrac{1}{3}\left[1 - a_1\left(2 + \frac{1}{\beta}\right)\right], p_2 = \tfrac{1}{3}\left[1 + a_1\left(1 - \frac{1}{\beta}\right)\right], \quad (10)$$

$$p_3 = \tfrac{1}{3}[1 + a_1(1 + 2/\beta)]; C_{11} = \frac{2}{1 + \beta} a_1, C_{22} = 0,$$

$$C_{33} = -\frac{2}{1 + \beta} a_1; C_{12} = \frac{1}{\sqrt{1 + \beta}} a_1, C_{23} = \frac{1}{\sqrt{\beta(1 + \beta)}} a_1,$$

$$C_{13} = \frac{1 - \beta}{\sqrt{\beta(1 + \beta)}} a_1$$

Note that relation (9) generally predicts different field amplitudes, and only for $\beta = 1$ reduces to the equal amplitude solutions ($\alpha_1 = \alpha_2 = \sqrt{2}$) predicted in the previous case for N=2 (three-level atom). We note that (10) again imposes conditions on the initial populations. Those conditions can be expressed in an alternative way as follows: $p_2 - p_1 = \beta(p_3 - p_2)$ i.e., the differences in coupling strengths of the two transitions have to be compensated by appropriate differences in the respective inversions. Relations (7a) and (9) imply that the area of at least one of the two pulses is always greater than $2\pi$, the area of the 2-level self induced transparency soliton solution. In particular, for $\beta = 1$ the two areas are identical and equal $\sqrt{2} (2\pi)$. We also obtain the following expression for the pulse length:

$$\frac{1}{\tau^2} = -\tfrac{1}{4} \frac{Ga_1}{\frac{1}{v} - \frac{1}{C}} \quad (11a)$$

and a related expression for a delay experienced by the simulton in propagating through a distance L, namely:

$$\tau_d = \tfrac{1}{4} G\tau^2 La_1. \quad (11b)$$

Both (11a) and (11b) differ only by $a_1$ from the corresponding expressions encountered in the long-known 2-level theory of self induced transparency.

(c) 3-level atom. Lambda or Vee (V) configurations. Oscillator strengths now have to satisfy the following condition:

$$\beta = 1 \quad (12a)$$

and the Rabi frequencies the condition $$\alpha_1^2 + \alpha_2^2 = 1 \quad (12b)$$

Coefficients $C_{in}$ and $p_j$ are now given by $$p_1 = \tfrac{1}{3}(1 - a_1), p_2 = \tfrac{1}{3}(1 + 2a_1), p_3 = \tfrac{1}{3}(1 - a_1); \quad (12c)$$

$$C_{11} = \tfrac{1}{3}a_1{}^2 a_1, C_{22} = -\tfrac{1}{3}a_1, C_{33} = \tfrac{1}{3}a_2{}^2 a_1;$$

$$C_{12} = \frac{a_1 a_1}{2}, C_{23} = -\frac{a_2 a_1}{2}, C_{13} = \frac{a_1 a_2}{2} a_1.$$

We note that these conditions on the initial populations can be re-expressed as simply $p_2 - p_1 = -(p_3 - p_2)$. Relation (12b) implies that, in the lambda configuration, the area of each individual pulse of the simulton is always less than $2\pi$.

The examples given above illustrate the fact that simulton propagation requires three conditions: the N pulses of the simulton must be (nearly) coincident; the absorbing medium must be, in general, partially excited out of its ground state in accordance with appropriate initial conditions $P_i$; the pulse amplitudes have to satisfy appropriate relations. In V and lambda configurations certain transitions, failing to satisfy (12a), will be completely unable to support simulton propagation.

The combinations of pulse areas that will propagate as simultons in a stable way are the areas $2n\pi a_1$, $2n\pi a_2$, $2n\pi a_3$ . . . and so on, for the pulses that are in energy interactional relationship with the first, second, third, and so on, transitions of the absorbing medium. The same is true for simultons in an amplifying medium, except that the areas are $(2n-1)\pi a_1$, $(2n-1)\pi a_2$, and so on. The symbol n stands for any integral real whole natural number, such as 0, 1, 2, 3, and so on.

In cases where the initial areas are different from the stable ones that are given above, the areas of the coincident or near coincident initial group of pulses will develop into the above areas as a result of propagation through the medium.

While a number of different embodiments of the invention have been described, variations and modifications thereof within the scope of the invention and even different transmission systems for optical and other electromagnetic signals embodying the invention will undoubtedly suggest themselves to those skilled in the art. Accordingly, the foregoing description including the Appendix referenced therein should be taken as illustrative and not in a limiting sense.

We claim:

1. The method for simultaneous propagation of a plurality of electromagnetic pulses of different wavelengths which comprises the step of applying said pulses in at least partially overlapping relationship in time to a channel containing a medium having a multiplicity of energy levels, and matching the wavelength of said pulses and the transitions between successive pairs of said levels so that different ones of said pulses are in resonant and energy interactional relationship with different ones of said transitions.

2. The method according to claim 1 further comprising controlling the occurrence of at least one of said pulses to control the ability of said pulses to propagate simultaneously through said channel.

3. The method according to claim 2 further comprising detecting the presence of said pulses in accordance with the time for propagation thereof through said channel.

4. The method according to claim 2 further comprising detecting the presence of said pulses according to the intensity thereof after propagation through said channel.

5. The method according to claim 1 further comprising restricting the duration of said pulses to be less than any homogeneous lifetime of said energy levels with which they are resonant.

6. The method according to claim 1 further comprising the step of exciting said medium at least partially out of its ground state to populate each of said levels.

7. The method according to claim 1 further comprising generating said pulses as coherent optical pulses with prescribed areas.

8. The method according to claim 1 wherein said energy levels in said medium are in the V or lambda configurations, and two of said pulses have different frequencies or polarizations in energy interactional relationship with the transitions between said energy levels (1, 2) and (2, 3) respectively, of said configurations, and said energy interactional relationship is provided by generating said pulses such that they evolve to areas that are equal to $n\pi\sqrt{2}$ when said medium is an absorber and $(2n-1)\pi/\sqrt{2}$ when said medium is an amplifying (population inverted) medium, where n is a whole real natural number.

9. The method according to claim 8 where said medium is an absorber, said transitions between said levels are in V configuration, and said generating step is carried out to provide each initial pulse with an area between $\pi/\sqrt{2}$ and $\pi$, so that said pulses are transmitted in said channel when at least nearly coincident (partially overlapping in time) and substantially absorbed when noncoincident.

10. The method according to claim 8 wherein said transitions between the (1, 2) and (2, 3) of said energy levels are in cascade configuration and said generating step is carried out by generating two of said pulses which evolve to areas that are equal to $2\pi n\alpha_1$, and $2\pi n\alpha_2$, for the first and second of said two pulses respectively when said medium is an absorber, and to $\pi(2n-1)\alpha_1$ and $\pi(2n-1)\alpha_2$, for said first and second pulses respectively, when said medium is an amplifying (population inverted) medium, where n is a whole real natural number, $\alpha_1 = 2/\sqrt{1+\beta}$, $\alpha_2 = 2\sqrt{\beta}/(1+\beta)$, and $\beta$ is the ratio of the second to the first transition oscillator strength.

11. The method according to claim 1 further comprising the step of transmitting information to said channel in accordance with the simultaneous presence of said pulses at the output thereof and detecting said information when one of said pulses is above a given intensity.

12. An optical system for transmission of a plurality of optical pulses without dispersion at an equal velocity lower than the speed of light, said system comprising a channel having input and output ends, said channel containing a medium having a plurality of connected dipole transitions among its energy levels when said levels are populated, and means for injecting at least two optical pulses each in resonant relationship with a different one of said transitions, and each having an intensity such that its area is related to the Rabi frequency of the transition with which it is in said resonant relationship.

13. The invention as set forth in claim 12 wherein said levels are in cascade configuration and said area is greater than $2\pi$.

14. The invention as set forth in claim 12 wherein said levels are in lambda or V configuration and said area is less than $2\pi$.

15. The invention as set forth in claim 14 wherein the dipole moment of said transitions are equal and the area of each of said pulses is $\sqrt{2} \times 2\pi$.

16. The invention as set forth in claim 12 further comprising means for exciting said medium to populate said energy levels.

17. The invention as set forth in claim 12 wherein said injecting means includes means for providing each of said pulses with a bandwidth narrower than the linewidth of the one of said transitions resonant therewith.

18. The invention as set forth in claim 12 wherein said transmission channel is longer than a multiplicity of wavelengths of the one of said pulses of longest wavelength.

19. The invention as set forth in claim 12 further comprising means for detecting the transmission of said pulses in accordance with the simultaneous occurrence thereof at the output end of said channel.

20. The invention as set forth in claim 12 further comprising means for detecting the transmission of said pulses through said channel in accordance with the amplitude of at least one of said pulses at the output end of said channel.

21. The invention as set forth in claim 12 further comprising means for detecting the transmission of said pulses through said channel in accordance with the time duration between the injection of at least one of said pulses at the input end of said channel and the reception of at least one of said pulses at the output end of said channel.

22. The invention as set forth in claim 12 further comprising means for detecting the coincident injection of both pulses at the input end of said channel upon the coincident reception of both of said pulses at the output end of said channel.

23. The invention as set forth in claim 12 wherein said pulses are of different wavelengths, said injecting meaans comprising means for controlling the simultaneity of successive sets of said pulses of different wavelengths to vary the intervals between successive pulses of the same wavelength at the output end of said channel.

24. The invention as set forth in claim 12 wherein said injecting means comprises means for controlling the absence and presence of at least one of said pulses for switching transmission through said channel between on and off states.

25. The invention as set forth in claim 12 wherein said injecting means includes means for injecting said pulses which are of different wavelength into said input end of said channel selectively in coincident relationship to control the transmission of signals in said channel.

26. The invention as set forth in claim 25 wherein said injecting means comprises means for generating said pulses successively in coherent relationship, and modulation means for selectively inhibiting different ones of said pulses.

27. The invention as set forth in claim 26 wherein said generating means comprises a light source and means operated by light from said source for providing beams of said pulses each of a different wavelength which provides said resonant relationship with different ones of said transitions.

28. The invention as set forth in claim 27 wherein said source is a pump laser and said means for providing said pulses of different wavelengths comprises separate dye lasers pumped simultaneously by said pump laser.

29. The invention as set forth in claim 25 wherein said source is a high power white light source, and means for providing said pulses of different wavelengths comprising a plurality of filters for passing light from said source at said different wavelength.

30. The invention as set forth in claim 27 wherein said injecting means comprises means for generating said beams with different apertures, the largest aperture beams encompassing the smaller aperture beams.

31. A system for amplifying electromagnetic input pulses, the said system having a medium presenting plurality of dipole transitions and an initial inversion of population, means for applying said input pulses to said medium at an input end thereof in coincidence and in resonance with said dipole transitions in the inverted medium whereby to allow simulton propagation of said pulses such that at the output end of the medium will appear coincident output pulses that are increased in intensity relative to the input pulses for efficient transfer of energy from the medium to an output radiation field.

* * * * *